United States Patent [19]

Maehara

[11] Patent Number: 5,071,201

[45] Date of Patent: Dec. 10, 1991

[54] BRAKE HYDRAULIC PRESSURE CONTROL APPARATUS

[75] Inventor: Toshifumi Maehara, Saitama, Japan

[73] Assignees: Akebono Brake Industry Co., Ltd., Tokyo; Akebono Research Search and Development Centre Ltd., Saitama, both of Japan

[21] Appl. No.: 466,628

[22] Filed: Jan. 17, 1990

[30] Foreign Application Priority Data

Jan. 18, 1989 [JP] Japan .................................. 1-7745

[51] Int. Cl.$^5$ ................................................ B60T 8/06
[52] U.S. Cl. ........................... 303/113 TR; 303/116 R
[58] Field of Search ............... 303/113, 114, 115, 116, 303/119

[56] References Cited

U.S. PATENT DOCUMENTS

| | | | |
|---|---|---|---|
| 4,796,958 | 1/1989 | Brown | 303/113 |
| 4,813,448 | 3/1989 | Leiber | 303/113 X |
| 4,867,509 | 9/1989 | Maehara et al. | 303/92 |

Primary Examiner—Matthew C. Graham

Attorney, Agent, or Firm—Finnegan, Henderson, Farabow, Garrett, and Dunner

[57] ABSTRACT

A brake hydraulic pressure control apparatus providing anti-lock control for preventing the locking of vehicle wheels during braking and providing traction control to prevent slipping of the vehicle wheels during starting or accelerating of the vehicle, comprises a master cylinder assembly, hydraulic passages within the master cylinder assembly, a distributor assembly removably attached to the master cylinder assembly. The distributor assembly includes a predetermined number of control channels for controlling vehicle wheels, a predetermined number of hydraulic passages, and a predetermined number of electromagnetic valves corresponding to the predetermined number of control channels. The electromagnetic valves are disposed in the hydraulic passages for performing the anti-lock and traction control on the vehicle wheels. The hydraulic passages of the master cylinder assembly are connected with the hydraulic passages of the distributor assembly when the master cylinder assembly and the distributor assembly are assembled. Furthermore, the number of the control channels change in accordance with the type of vehicle based upon performance and economic considerations.

5 Claims, 11 Drawing Sheets

BRAKE HYDRAULIC PRESSURE CONTROL APPARATUS

BACKGROUND OF THE INVENTION

1. Field of the Invention

The present invention relates to a brake hydraulic pressure control apparatus for use in an anti-lock control for preventing the locking of vehicle wheels during braking and for traction control for preventing slipping of the driving wheels at the time of starting or accelerating the vehicle.

2. Description of the Prior Art

Anti-lock control apparatus is used for preventing the locking of wheels during braking of the vehicle to assure the security of steering properties and running stability of the vehicle and for reduction of braking distance. The control modes of such apparatus (i.e., a pressurization mode, a pressure reducing mode, and a hold mode) for controlling brake hydraulic pressure are determined in a response to electric signals representative of the wheel speed and are obtained from the wheels and speed sensors. The brake hydraulic pressure is controlled by a micro-computer which controls the opening or closing of hold valves (i.e., pressurizing or holding valves) and decay valves (i.e., pressure reducing valves), which are electromagnetic valves, in accordance with the control modes, so as to pressurize, hold or reduce the brake hydraulic pressure.

In general, vehicle anti-lock control methods are classified into several groups, such as, a four-channel control method for separately controlling four wheels of a vehicle, a three-channel control method for separately controlling front left and right wheels, but collectively controlling rear wheels, or a two-channel control method for separately controlling front and rear wheel group. Hold valves and decay valves of the same number as the number of control channels are required.

The number of the control channels change in accordance with the type of vehicle based upon performance and economic considerations. In the prior art, when the number of the control channels are changed, the master cylinder must too be changed.

SUMMARY OF THE INVENTION

It is therefore an object of the present invention to provide a brake hydraulic pressure control apparatus in which the number of control channels can be selected and changed without changing the master cylinder.

In accordance with the invention, a brake hydraulic pressure control apparatus providing anti-lock control for preventing the locking of vehicle wheels during braking and providing traction control to prevent slipping of the vehicle wheels during starting or accelerating of the vehicle comprises a master cylinder assembly, hydraulic passages within the master cylinder assembly, and a distributor assembly removably attached to the master cylinder assembly. The distributor assembly includes a predetermined number of control channel means for controlling vehicle wheels, a predetermined number of hydraulic passages, and a predetermined number of electromagnetic valves corresponding to the predetermined number of control channel means, the electromagnetic valves being disposed in the hydraulic passages for performing the anti-lock and traction control on the vehicle wheels, and connecting means for connecting the hydraulic passages of the master cylinder assembly with the hydraulic passages of the distributor assembly when the master cylinder assembly and the distributor assembly are assembled.

It is to be understood that both the foregoing general description and the following detailed description are exemplary and explanatory only and are not restrictive of the invention, as claimed.

DESCRIPTION OF PREFERRED EMBODIMENTS

A preferred embodiment of the present invention will now be described in detail with reference to the accompanying drawings.

Figure 1:
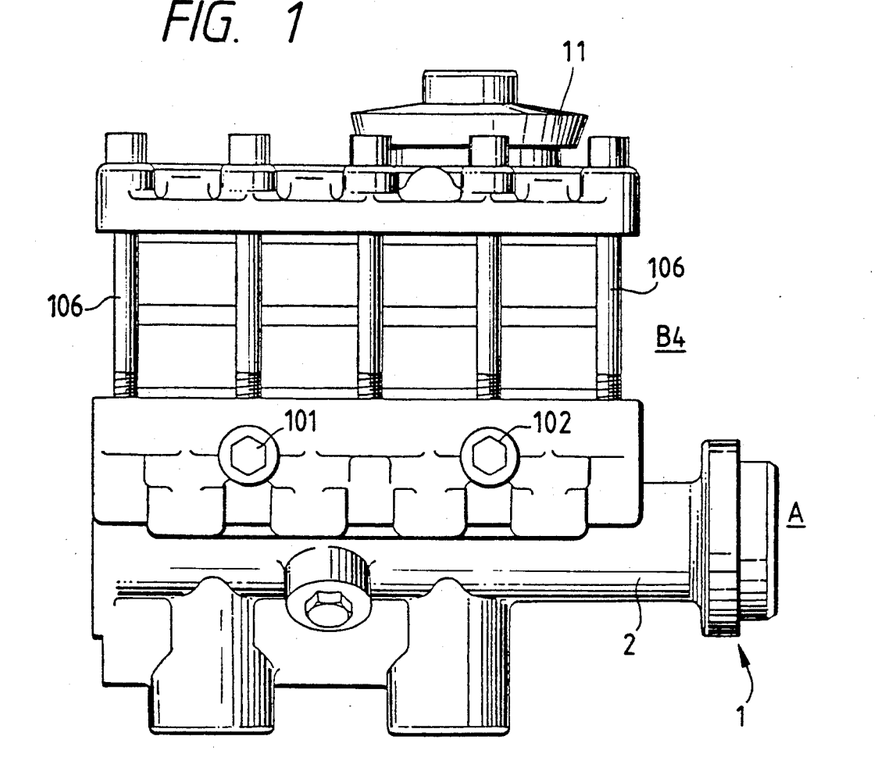
FIG. 1 is a front view of a four-channel control type brake hydraulic pressure control apparatus of the present invention.
Figure 2:
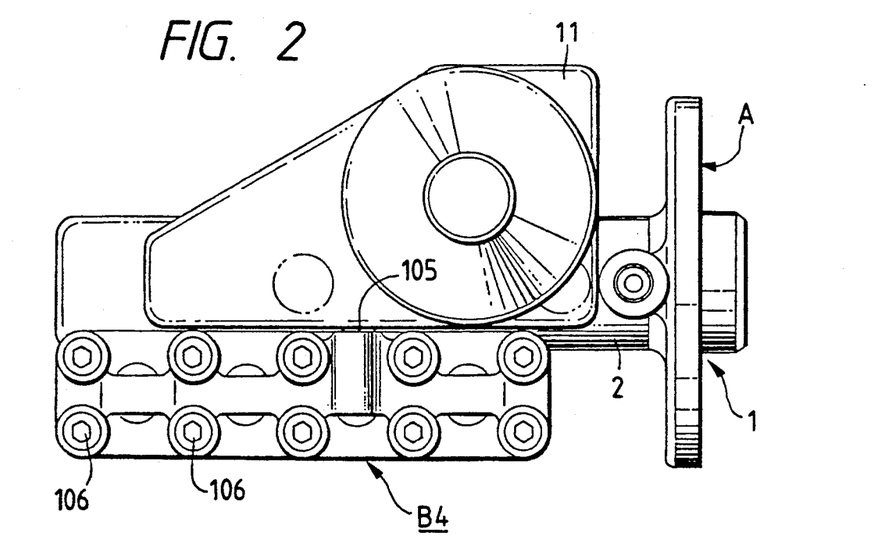
FIG. 2 is a plan view of the apparatus of FIG. 1.

FIG. 1 is a front view showing the general configuration of an embodiment of the brake hydraulic pressure control apparatus according to the present invention. FIG. 2 is a plan view thereof. In the drawings, the apparatus comprises a master cylinder assembly A, and a four-channel control distributor assembly B4 removably attached to the master cylinder assembly A through two attachment bolts 101 and 102.

Figure 3:
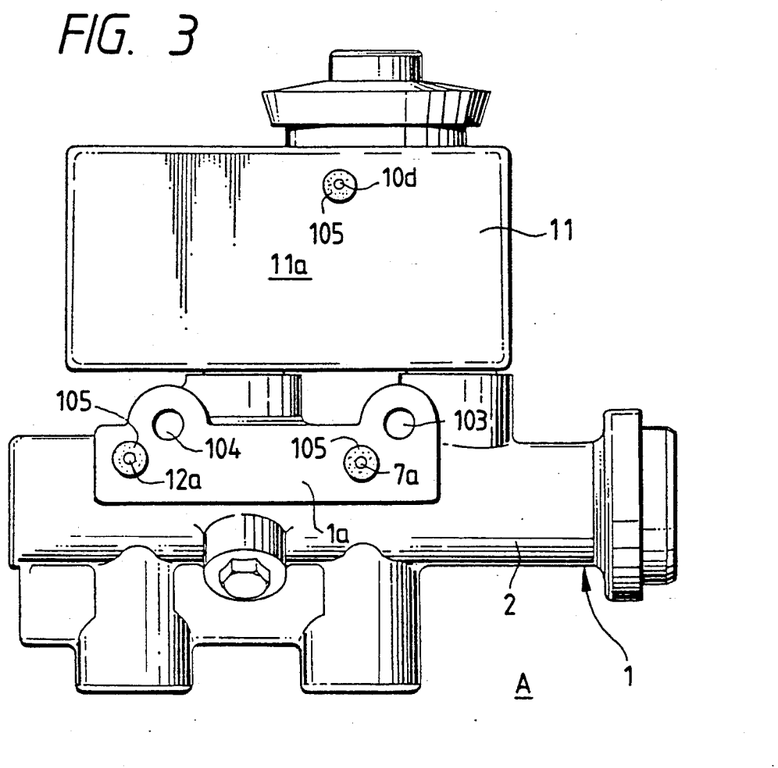
FIG. 3 is a front view of a master cylinder assembly of the present invention.

As shown in FIG. 3, the master cylinder assembly A comprises a master cylinder body 1, and a reservoir 11 fixed in the upper portion of a housing 2 of the master cylinder body 1. The master cylinder body 1 has an attachment surface 1a for attaching the distributor assembly B4 thereon. The attachment surface 1a is provided with screw-holes 103 and 104 to receive bolts 101 and 102. Inner hydraulic passages 7a and 12a are open at the surface. The housing of the reservoir 11 has a flat attachment surface 11a in which an inner hydraulic passage 10d is open. The opening portions of the hydraulic passages 7a, 12a and 10d are respectively surrounded by seal members 105.

Figure 4:
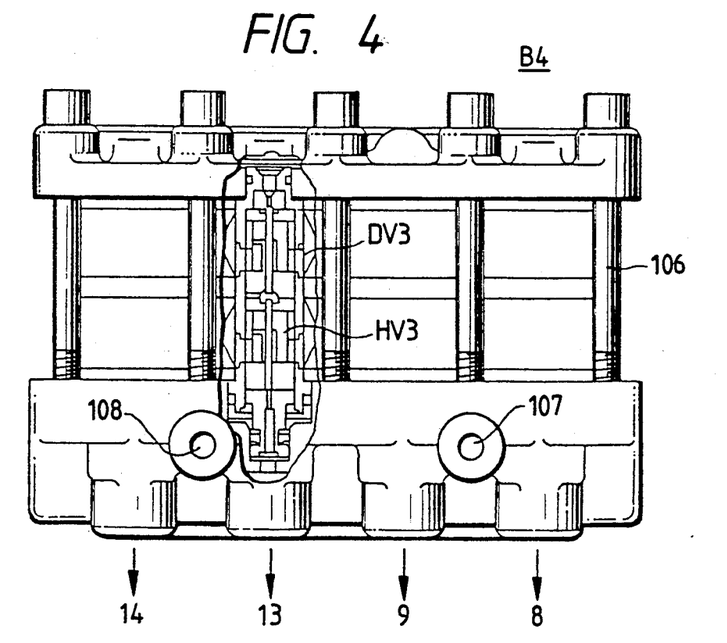
FIG. 4 is a partial cutaway front view of a four-channel control distributor assembly of the present invention.

The distributor assembly B4 as shown in FIG. 4 has two bolt insertion holes 107 and 108 and contains four hold valves HV1 to HV4 and four decay valves DV1 to DV4. The distributor assembly B4 is assembled by ten of bolts 106. Three hydraulic passages to be respectively connected with hydraulic passages 7a, 12a and 10d of master cylinder assembly A are open at an attachment surface (not shown) of the distributor assembly B4 to communicate with the master cylinder assembly A. When the distributor assembly B4 is fixed to the master cylinder assembly A through attachment bolts 101 and 102, the hydraulic passages in the distributor assembly B4 communicate with the hydraulic passages 7a, 12a and 10d in the master cylinder assembly A in a liquid tight manner.

Figure 5:
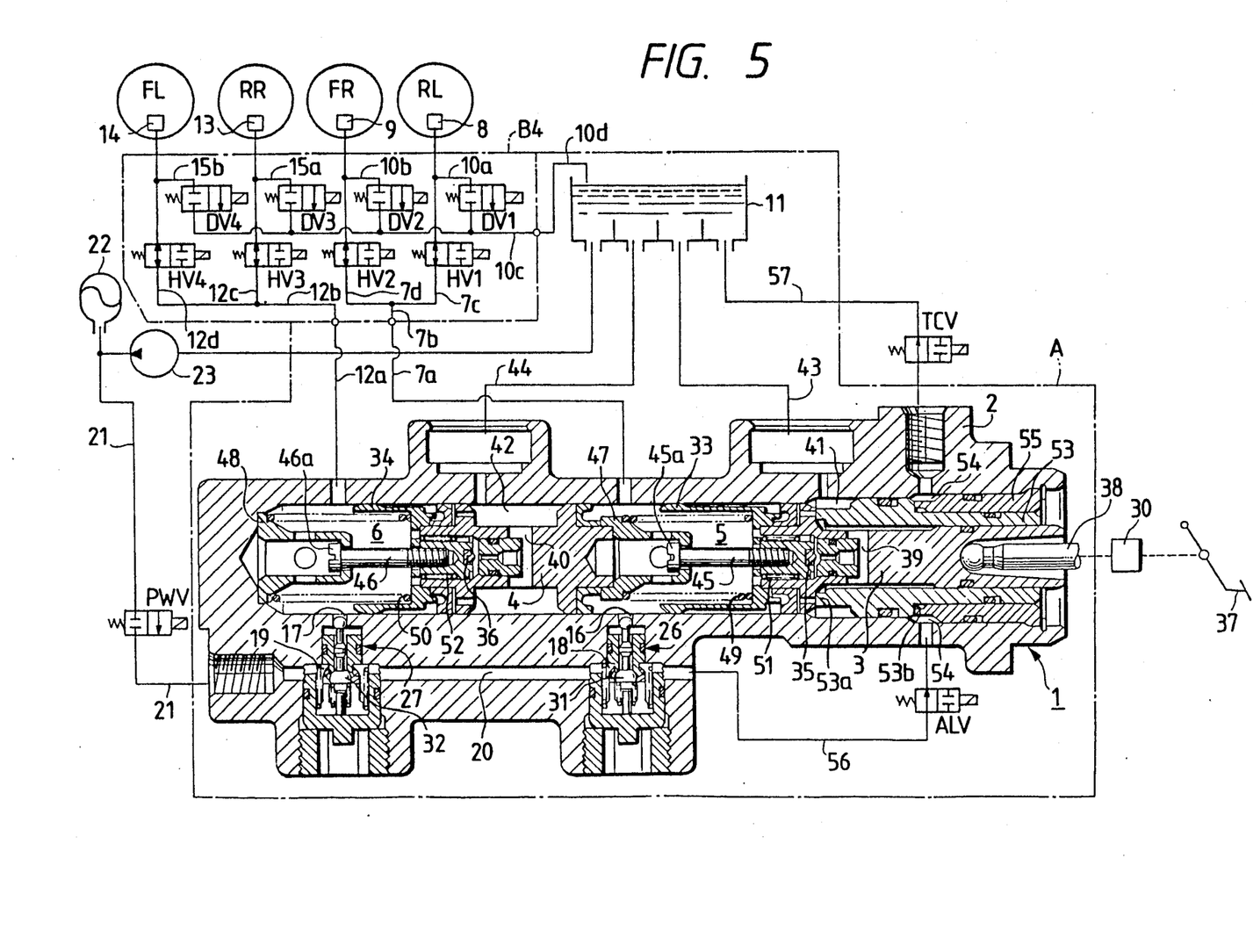
FIG. 5 is a cross-sectional view of the internal configuration of the brake hydraulic pressure control apparatus depicted in FIG. 2.

FIG. 5 is a cross-sectional view of the inner configuration of the brake hydraulic pressure control apparatus depicted in FIGS. 1 and 2. In the drawing, the master cylinder assembly A and the distributor assembly B4 are shown in cross-section.

The tandem master cylinder body 1 forming the master cylinder assembly A has a primary piston and a secondary piston 4 provided in its housing 2, and hydraulic pressure chambers 5 and 6, the pressures of which are controlled by the pistons 3 and 4, respectively.

A hydraulic passage 7a communicates with the hydraulic pressure chamber 5, the pressure of which is controlled by the primary piston 3, and the hydraulic passage 7a is connected to the hydraulic passage 7b in the distributor assembly B4. The hydraulic passage 7b is connected both to a wheel cylinder 8 of the rear left wheel RL and to a wheel cylinder 9 of the front right wheel FR through hydraulic passages 7c and 7d in which hold valves HV1 and HV2 of the normally opened electromagnetic valve type are provided. The wheel cylinders 8 and 9 are connected to a hydraulic passage 10c through hydraulic passages 10a and 10b having decay valves DV1 and DV2 of a normally closed type electromagnetic valve. The hydraulic passage 10c communicates with the hydraulic passage 10d so that the wheel cylinders communicate with the reservoir 11 through the hydraulic passage 10d.

Similarly, a hydraulic passage 12a communicates with the hydraulic pressure chamber 6, the pressure of which is controlled by the secondary piston 4, and the hydraulic passage 12a is connected to the hydraulic passage 12b in the distributor assembly B4. The hydraulic passage 12b is connected both to a wheel cylinder 13 of the rear right wheel RR and to a wheel cylinder 14 of the front left wheel FL through hydraulic passages 12c and 12d having hold valves HV3 and HV4 constituted by normally opened electromagnetic valves provided therein. The wheel cylinders 13 and 14 are connected to the hydraulic passage 10c through hydraulic passages 15a and 15b having decay valves DV3 and DV4 constituted by normally closed type electromagnetic valves provided in the passages so that the wheel cylinders communicate with the reservoir 11 through the hydraulic passage 10d.

Valve chambers 18 and 19 have opening portions 16 and 17 which communicate with the hydraulic pressure chambers 5 and 6, respectively, and are formed in the housing 2 of the master cylinder body 1. The valve chambers 18 and 19 are connected together through a hydraulic passage 20 formed in the housing 2. The valve chamber 19 is connected to an accumulator 22 through a hydraulic passage 21 in which a supply valve PWV of the normally closed type electromagnetic valve is provided. The accumulator 22 is connected to the output side of a hydraulic pressure pump 23, while the suction side is connected to the reservoir 11. As will be described later, valve mechanisms 26 and 27 respectively having intake valves 31 and 32 serving as check valves, are provided in the valve chambers 18 and 19, respectively.

Cylindrical intake sleeves 33 and 34 for operating the intake valves 31 and 32 are fixed to the primary and secondary pistons 3 and 4 and face the hydraulic pressure chambers 5 and 6, respectively. The primary and secondary pistons 3 and 4 contain center valves 35 and 36 which are movable along the axis of the master cylinder 1, relative to the pistons 3 and 4. In the case where a brake pedal 37 is not yet pushed and, accordingly, a push rod 38 connected to the brake pedal 37 through a booster 30 does not yet press the primary piston 3, as shown in FIG. 5, the hydraulic chambers 5 and 6 communicate with the reservoir 11 through the center valves 35 which are in their open positions, passages 39 and 40 in pistons 3 and 4, annular chambers 41 and 42 formed around the pistons 3 and 4, and hydraulic passages 43 and 44, respectively. When the brake pedal 37 is pushed to operate the push rod 38 to move the primary piston 3 to the left as shown in FIG. 5, the center valve 35 is moved to its closed position to cut off the hydraulic pressure chamber 5 from the reservoir 11. Accordingly, the hydraulic pressure in the hydraulic chamber 5 increases, so that the brake fluid in the hydraulic chamber 5 is supplied to the wheel cylinders 8 and 9 through the open-state hold valves HV1 and HV2 to control the wheels RL and FR. Further, the secondary piston 4 is operated by the increase of the hydraulic pressure in the hydraulic pressure chamber 5 to move the center valve 36 to its closed position, so that the hydraulic pressure chamber 6 is cut off from the reservoir 11. Accordingly, the hydraulic pressure in the hydraulic pressure chamber 6 also increases, so that brake fluid in the hydraulic pressure chamber 6 is supplied to the wheel cylinders 13 and 14 through the open-state hold valves HV3 and HV4 to control braking of wheels RR and FL.

The aforementioned positional relationships and operations of the respective members are attained by stop bolts 45 and 46 having the center valves 35 and 36 at one end portion, stop bushings 47 and 48 engaged with heads 45a and 46a provided at the opposite end portion of the stop bolts 45 and 46, contracted springs 49 and 50 provided between the stop bushings 47 and 48 and the intake sleeves 33 and 34, and springs 51 and 52 for urging the center valves 35 and 36 toward their closed positions, respectively.

A cylindrical auxiliary piston 53 is provided in the annular chamber 41 formed between the housing 2 of the master cylinder body 1 and the primary piston 3, the auxiliary piston being coaxial with piston 3 and being slidable relative to both the housing 2 and the primary piston 3. A projection 53a provided on the left end of the auxiliary piston 53 contacts primary piston 3. The auxiliary piston 53 has an annular pressure-receiving stepping portion 53b formed and facing in a right-hand direction as shown in FIG. 5. An auxiliary hydraulic pressure chamber 54 is formed on the right-hand side of the stepping portion 53b.

Reference numeral 55 designates a stopper member for blocking the auxiliary hydraulic pressure chamber 54 and serves to limit the auxiliary piston 53 from moving to the right. The auxiliary hydraulic pressure chamber 54 is connected to the valve chamber 18 in the housing 2 through a hydraulic passage 56 having an anti-lock valve ALV of a normally opened type electromagnetic valve. Accordingly, pressurized brake fluid from the accumulator 22 is fed to the auxiliary hydraulic pressure chamber 54 through the hydraulic passage 21 having the supply valve PWV and the hydraulic passage 20 connecting valve chambers 18 and 19. Further, the auxiliary hydraulic pressure chamber 54 is connected to the reservoir 11 through a hydraulic passage 57 having a traction control valve TCV of a normally opened type electromagnetic valve provided in the middle thereof which is closed only during traction control.

As described above, the normally opened anti-lock valve ALV is provided in the hydraulic passage 56 connected to the auxiliary hydraulic pressure chamber 54, so that the anti-lock valve ALV is closed only during anti-lock control to thereby block the hydraulic passage leading from the valve chambers 18 and 19 into the reservoir 11 via the auxiliary hydraulic pressure chamber 54. Further, the hydraulic passage 56 communicates with hydraulic passages 21 and 20 connecting the accumulator 22 and the hydraulic pressure chambers 5 and 6. Furthermore, the auxiliary hydraulic pressure chamber 54 is connected to the reservoir 11 through the hydraulic passage 57 having the normally opened traction control valve TCV which is closed only during traction control. Accordingly, the pressure in the valve chambers 18 and 19 and the auxiliary hydraulic pressure chamber 54 is equal to atmospheric pressure at all times except during anti-lock and traction control, so that no hydraulic pressure remains in the hydraulic passages leading from the supply valve PWV into the traction control valve TCV via the anti-lock valve ALV.

Figure 6:
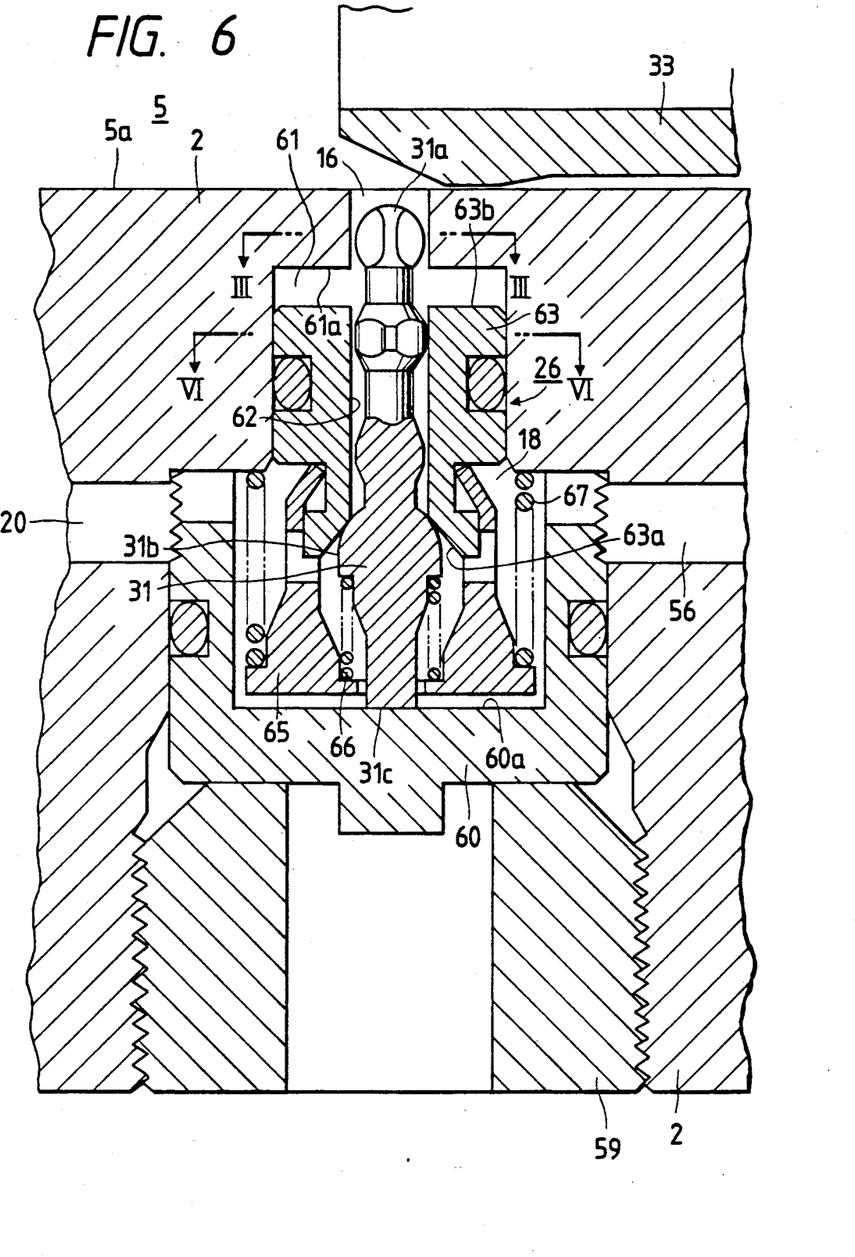
FIG. 6 is an enlarged cross-sectional view of the valve mechanisms of the apparatus of FIG. 5.

FIG. 6 is an enlarged cross-sectional view showing an example of the configuration of the valve mechanism 26, in which the valve chamber 18 is constituted by a cup-shaped plug 60 fixed to the housing 2 by a set screw 59. A piston chamber 61 is formed adjacent to the opening portion 16 of the valve chamber 18 opening into the hydraulic pressure chamber 5, so as to be coaxial with the opening portion 16. A piston 63 having a center hole 62 formed axially therethrough and serving as a valve holding member is provided and is slidable in a direction perpendicular to the inner circumferential surface 5a of the hydraulic pressure chamber 5, so as to have an axis in accordance with the axis of the opening portion. A conical valve seat surface 63a is formed at an end portion (opposite side to the opening portion 16) of the center hole 62 of the piston 63.

The intake valve 31 is constituted by a rod-like poppet valve piercing both the opening portion 16 of the housing 2 and the center hole 62 of the piston 63 and the forward end portion 31a moves in and out of hydraulic pressure chamber 5 as the valve moves. The intake valve 31 has a semispherical valve portion 31b seated on the valve seat surface 63a of the piston 63. The forward end portion 31a and the shaft portion of the intake valve 31 have a substantially tetragonal cross-section whose four corners slidably contact the inner circumferential surface of the opening portion 16 of the housing 2 and the inner circumferential surface of the center hole 62 of the piston 63 to prevent the intake valve 31 from becoming entangled when the intake valve is pressed down by the intake sleeve 33. Therefore, the operation of the intake valve can be smooth and at the same time, a hydraulic passage can be formed around the outer circumferential surface of the intake valve 31.

A spring holder 65 is integrally combined with the piston 63. A contracted check spring 66 is disposed between the spring holder 65 and the intake valve 31 so that the valve portion 31b of the intake valve 31 is urged by a predetermined check pressure of the spring, so as to sit on the valve seat surface 63a of the piston 63. Further, the piston 63 is biased so as to be distant from the opening portion 16 by a contracted set spring 67 disposed between the spring holder 65 and a wall surface of the valve chamber 18. The biasing force of the set spring 67 is designed to be greater than that of the check spring 66, so that the piston 63 is kept in a state as shown in FIG. 6 by the biasing force of the set spring 67 when the base end surface 31a of the intake valve 31 comes into contact with the inner wall surface 60a of the plug 60. The biasing force of the set spring 67 also acts between the valve seat surface 63a of the piston 63 and the valve portion 31b of the intake valve 31.

In short, at all times except during anti-lock and traction control, as is obvious from FIG. 5, the supply valve PWV is closed and the anti-lock valve ALV and the traction control valve TCV are both open. Accordingly, no hydraulic pressure acts on the valve chamber 18, so that the end surface 63b of the piston 63 is disengaged from the wall surface 61a of the piston chamber 61, so that the forward end portion 31a of the intake valve 31 projects into the opening portion 16. When the primary piston 3 is moved by pushing the brake pedal 37 to increase the hydraulic pressure in the hydraulic pressure chamber 5, the valve seat surface 63a of the piston 63 is further pressed to the valve portion 31b of the intake valve 31 by the hydraulic pressure applied to the other end surface 63b of the piston 63, thus improving the sealing properties of the valve portion 31b.

Figure 7:
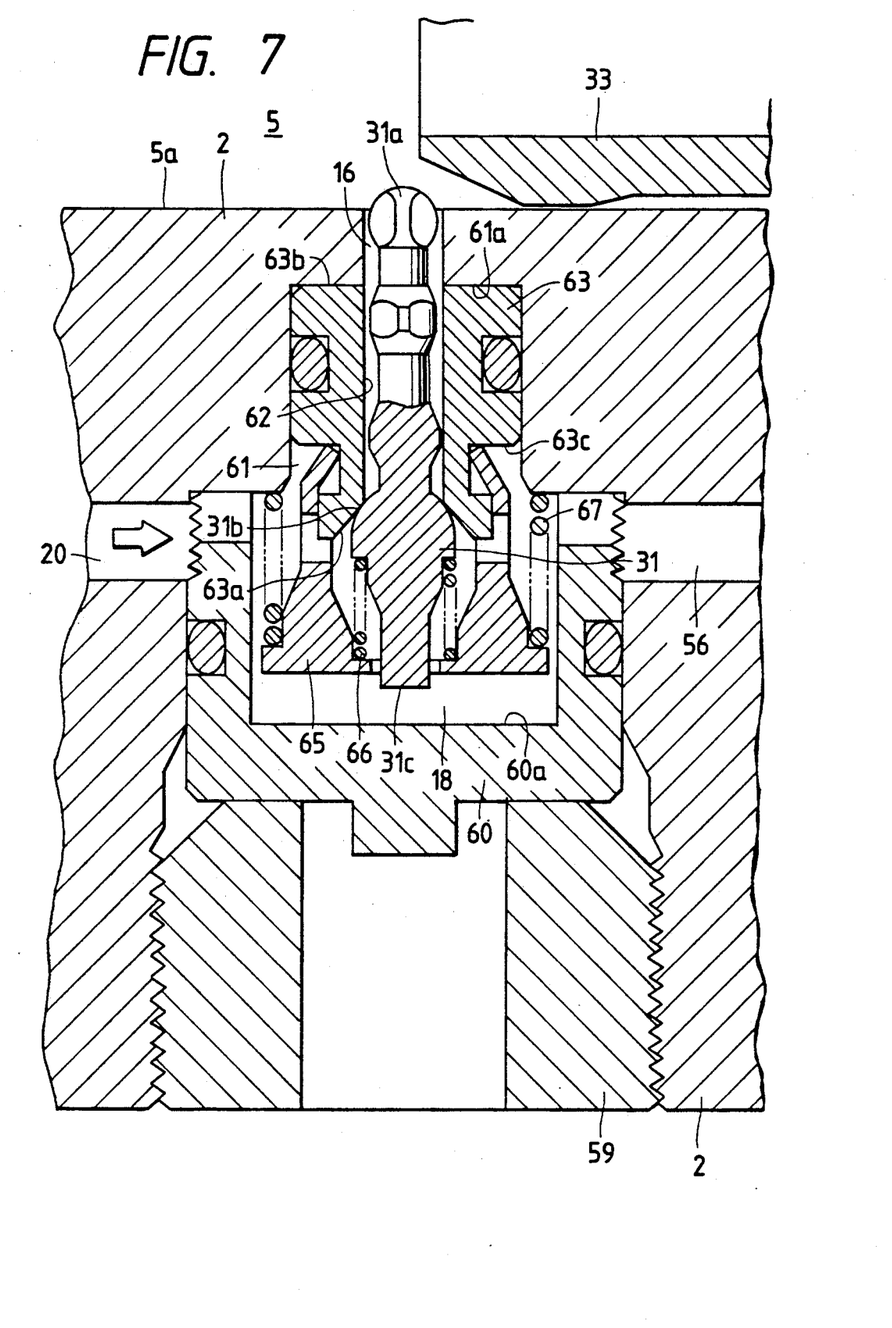
FIGS. 7 and 8 are enlarged cross-sectional views showing the operation of the valve mechanisms.

FIG. 7 shows a condition of the valve mechanism 26 in the case where anti-lock control or traction control is started so that the supply valve PWV is opened and either one of the anti-lock valve ALV or the traction control valve TCV is closed to cut off the hydraulic passage leading into the reservoir 11. In this case, high-pressure brake fluid from the accumulator 22 flows into the valve chamber 18 through the hydraulic passages 21 and 20, so that hydraulic pressure is applied to the end surface 63c of the piston 63, opposite to the end surface 63b thereof. Accordingly, the piston 63 is moved toward the opening portion 16 against the biasing force of the set spring 67 while the intake valve 31 is held against valve seat surface 63a by the biasing force of the check spring 66. Consequently, the end portion 63b of the piston 63 comes into contact with the wall surface 61a of the piston chamber 61 and stops. In this condition, the forward end portion 31a of the intake valve 31 projects into the hydraulic pressure chamber 5.

Figure 8:
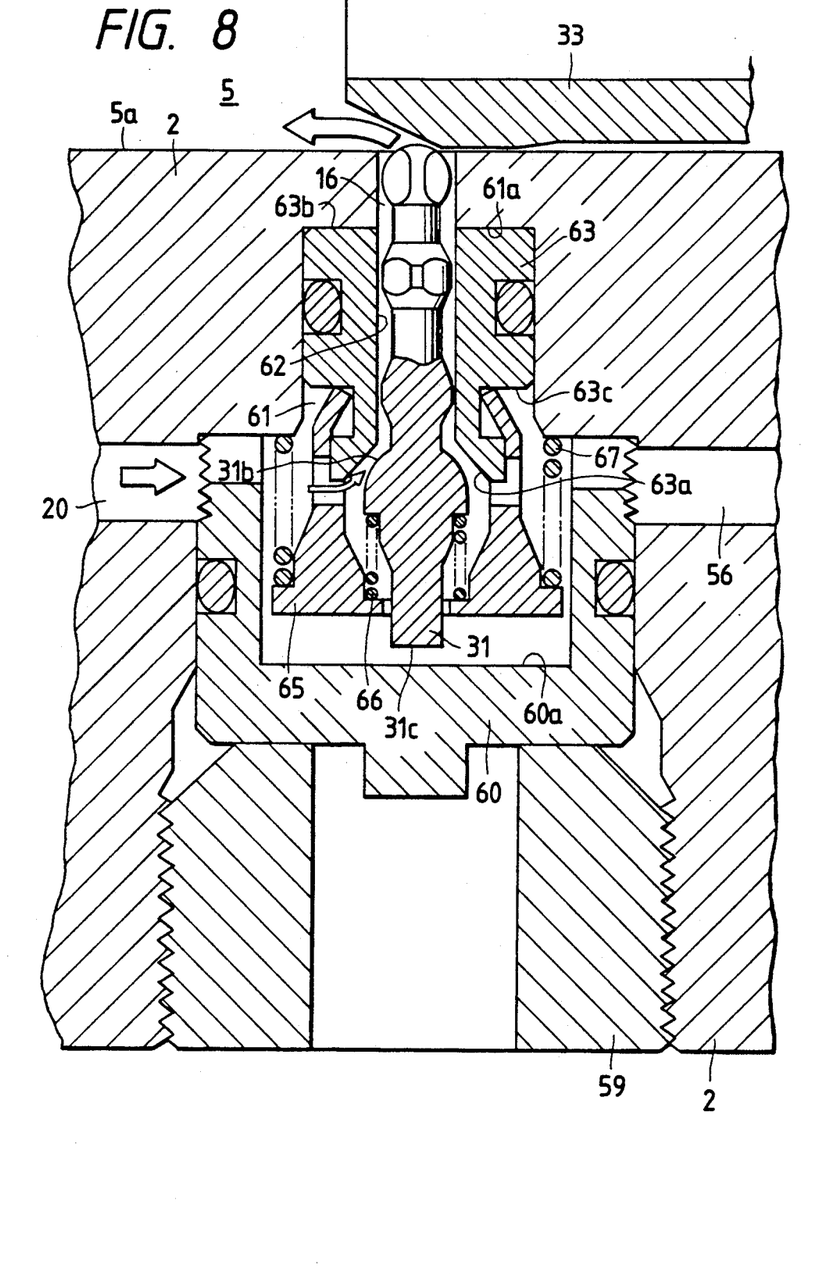

Accordingly, when the primary piston 3 moves to the left as shown in FIG. 1, the intake sleeve 33 engages the forward end portion 31a of the intake valve 31 as shown in FIG. 8 to press the intake valve 31 downward against the biasing force of the check spring 66. As a result, the valve portion 31b is disengaged from valve seat surface 63a of the piston 63 and, accordingly, a high-pressure brake fluid from the accumulator 22 is fed into the hydraulic pressure chamber 5.

In the following, the operation of the brake hydraulic pressure control apparatus depicted in FIG. 5 is described with reference to FIGS. 9 and 10.

Figure 9:
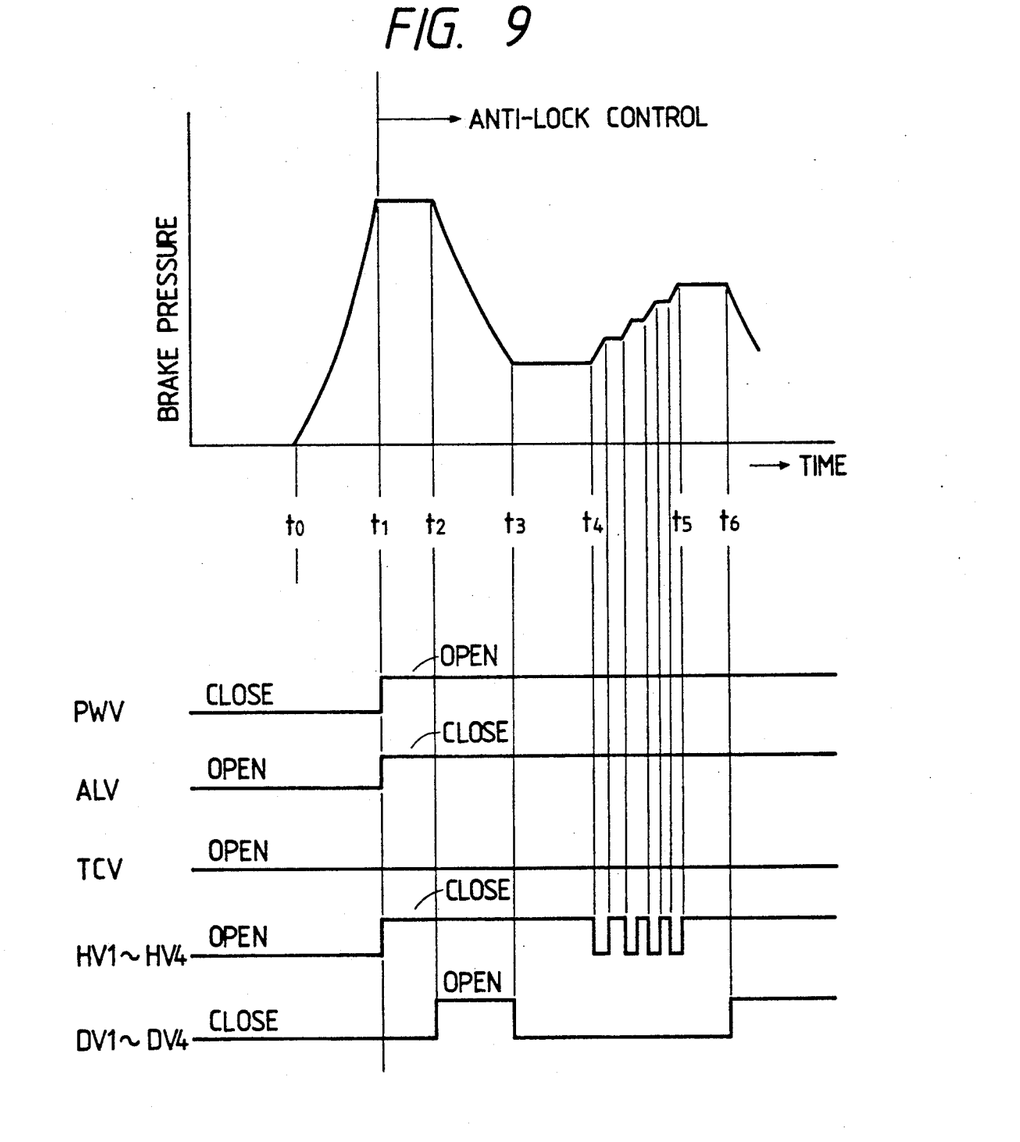
FIG. 9 is a time chart showing anti-lock control effected by the apparatus of FIG. 5.

FIG. 9 is a time chart showing the state of the changing of the brake hydraulic pressure during ordinary braking control and during anti-lock control, following the ordinary control time, together with the respective states of opening and/or closing of the supply valve PWV, anti-lock valve ALV, traction control valve TCV, hold valves HV1 to HV4 and decay valves DV1 to DV4. Although hydraulic pressures in four braking systems are, in practice, controlled separately, the following description is simplified on the assumption that all the systems are operated at once.

(A) In Ordinary Braking Control ($t_0$ to $t_1$ in FIG. 9)

By pushing the brake pedal 37 down the supply valve PWV is closed (OFF), and anti-lock valve ALV and the traction control valve TCV are both open (OFF) hold valves HV1 to HV4 are open (OFF) and the delay valves DV1 to DV4 are closed (OFF) as shown in FIG. 5. The primary piston 3 is pressed by the push rod 38 and moved in the left-hand direction as shown in FIG. 5 to close the center valve 35, and at the same time, the secondary piston 4 is also moved to the left to close the center valve 36. In this case, the valve mechanisms 26 and 27 are in the states shown in FIG. 6, so that hydraulic pressure is produced in the hydraulic pressure chambers 5 and 6 and fed to the wheel cylinders 8, 9, 13 and 14 to perform braking control.

(B) In Anti-lock Control

When speed deceleration exceeding a predetermined value of wheel speed is detected through the increase of hydraulic pressure in the wheel cylinders, a hold signal is generated from a control circuit (not shown) configured by a micro-computer so that anti-lock control is started at time $t_1$.

(1) Hold Mode ($t_1$ to $t_2$ in FIG. 9)

At time $t_1$ (FIG. 9), the supply valve PWV is opened (turned ON), the anti-lock valve ALV is closed (turned OFF) and the hold valves HV1 to HV4 are closed (turned ON) to cut off the hydraulic passages 7c and 7d leading into the wheel cylinders 8 and 9 and to close the hydraulic passages 12c and 12d leading into the wheel cylinders 13 and 14, so that hydraulic pressures in the wheel cylinders 8, 9, 13 and 14 are maintained. In this case, the valve mechanisms 26 and 27 are in the states shown in FIG. 7, so that the forward end portions 31a and 32a of the intake valves 31 and 32 project into the hydraulic pressure chambers 5 and 6, respectively. If the intake sleeves 33 and 34 are in positions where the intake valves 31 and 32 can be pressed downward by the intake sleeves, the valve mechanisms 26 and 27 are turned to the states shown in FIG. 8, so that high-pressure brake fluid from the accumulator 22 flows into the hydraulic pressure chambers 5 and 6 through the hydraulic passages 21 and 20. Due to the brake hydraulic pressure, the pistons 3 and 4 are moved back to positions where the intake sleeves 33 and 34 are disengaged from the intake valves 31 and 32, so that the hydraulic pressure in the hydraulic pressure chambers 5 and 6 is proportional to the force of pushing the brakepedal 37. In this case, the intake sleeves 33 and 34 press the intake valves upward corresponding to the positions of the primary and secondary pistons 3 and 4, so that the hydraulic pressure chambers 5 and 6 are connected to the accumulator 22. As a result, the pistons 3 and 4 are moved back by the hydraulic pressure from the accumulator 22 until the intake valves 31 and 32 close the opening portions 16 and 17. Accordingly, sufficient hydraulic pressure can be maintained in the hydraulic pressure chambers 5 and 6, even if a failure occurs in the hydraulic pressure source systems.

(2) Pressure Reducing Mode ($t_2$ to $t_3$ in FIG. 9)

When the wheel speed is further reduced, the decay valves DV1 to DV4 are open (turned ON) at time $t_2$, so that brake fluids within wheel cylinders 8, 9, 13 and 14 flow into the reservoir 11 through the hydraulic passages 10a, 10b, 15a and 15b. Accordingly, hydraulic pressure of the brake fluids in the wheel cylinders is reduced.

(3) Hold Mode ($t_3$ to $t_4$ in FIG. 9)

At time $t_3$ when the wheel speed begins to recover from its low peak by the pressure reduction of the brake hydraulic pressures, the decay valves DV1 to DV4 are closed (turned OFF), so that the situation is returned to the hold mode.

(4) Pressurization Mode ($T_4$ to $t_5$ in FIG. 9)

When the wheel speed reaches its high peak, the hold valves HV1 to HV4 are opened (turned OFF), so that the pistons 3 and 4 move leftward to open the intake valves 31 and 32 to feed the hydraulic pressure of the accumulator 22 to the wheel cylinders 8, 9, 13 and 14 through the hydraulic pressure chambers 5 and 6. In the pressurization mode which is started at the time $t_4$ (FIG. 9), the brake hydraulic pressures are increased stepwise by quickly turning hold valves HV1 to HV4 ON and OFF.

(5) Hold Mode ($t_5$ to $t_6$ in FIG. 9)

When the reduction of the wheel speed begins by the pressurization of the brake hydraulic pressures, the situation is returned to the hold mode again, so that the hold valves HV1 to HV4 are closed (turned OFF). At the point of time $t_6$, the decay valves DV1 to DV4 are opened (turned ON) so that the situation is returned to the pressure reducing mode.

(C) In Traction Control

In the case of traction control for preventing slipping of the driving wheels FR and FL during starting or accelerating of the vehicle, the mode of the control circuit (not shown) configured by a micro-computer is turned to a pressurization mode at time $t_{11}$ (in FIG. 10) when the slipping of the driving wheels RL and RR is detected.

(1) Pressurization Mode ($t_{11}$ to $t_{12}$).

Figure 10:
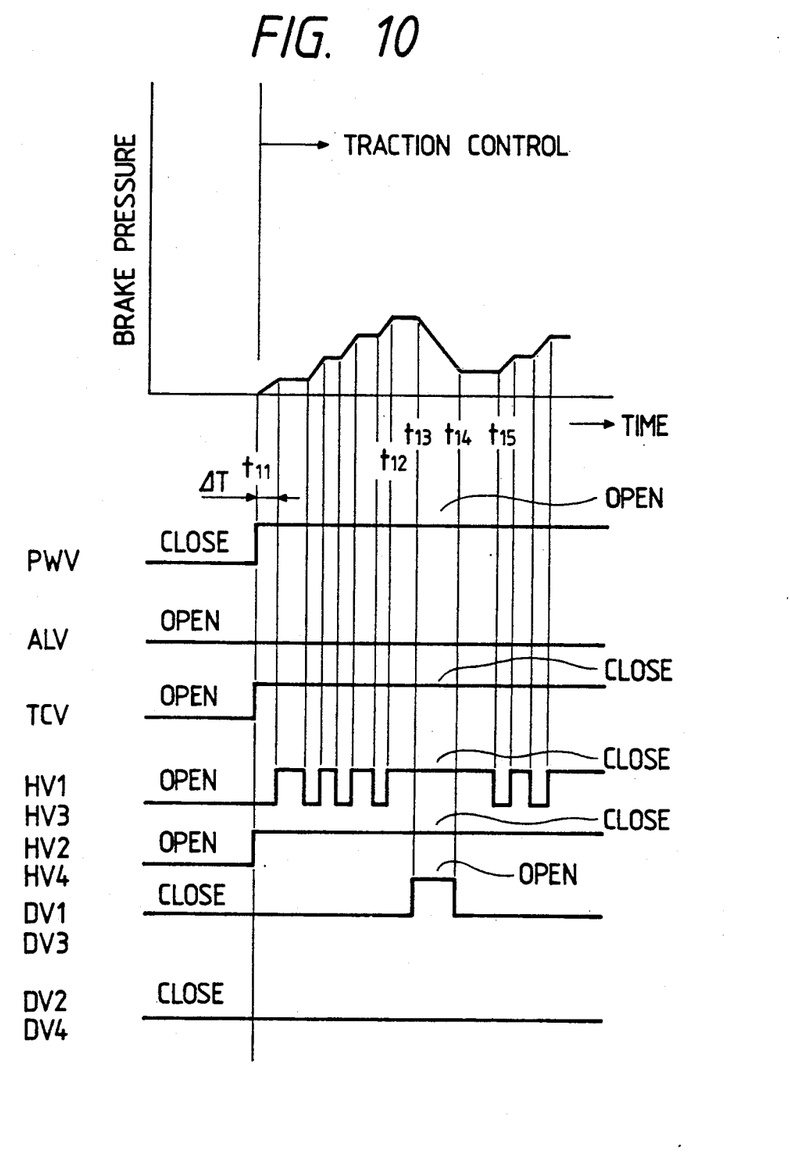
FIG. 10 is a time chart for illustrating the traction control effected by the apparatus of FIG. 5.

At time $t_{11}$ in FIG. 10, the hold valves HV2 and HV4 and the traction control valve TCV are closed (turned ON). Accordingly, both the connections between the wheel cylinders 9 and 14 of the follower wheels FR and FL and the hydraulic pressure chambers (main hydraulic pressure chambers) 5 and 6 of the master cylinder 1 and the connection between the auxiliary hydraulic pressure chamber 54 and the reservoir 11 are cut off. At this time, the anti-lock valve ALV is opened (OFF), so that the auxiliary hydraulic pressure chamber 54 is connected to the accumulator 22 to increase the pressure in the auxiliary hydraulic pressure chamber 54 to move the auxiliary piston 53 towards the left (FIG. 5). At this time, the primary piston 3 is pressed by the auxiliary piston 53 and moved to the left to thereby increase the brake hydraulic pressures in the wheel cylinders 8 and 13, so that the pressurization mode exists.

During a predetermined period $\Delta T$ after initiation of traction control at time $t_{11}$, the hold valves HV1 and HV3 are opened (OFF) so that preliminary pressurization is carried out during the period. Thereafter, the hold valves HV1 and HV3 are closed (turned ON) so that the brake hydraulic pressures are maintained. Thereafter, the brake hydraulic pressures are increased stepwise by quickly turning hold valves HV1 and HV3 ON and OFF.

(2) Hold Mode ($t_{12}$ to $t_{13}$ in FIG. 10)

At time $t_{12}$ when slipping of the driving wheels RL and RR is reduced, the hold valves HV1 and HV3 are closed (turned ON) so that the hold mode exists.

(3) Pressure Reducing Mode ($t_{13}$ to $t_{14}$ in FIG. 10)

The decay valves DV1 and DV3 are closed (turned On) at time $t_{13}$ so that the pressure reducing mode is present. Thereafter, respective modes are repeated in the same manner as described above in the anti-lock control.

In this case, hydraulic pressure in the auxiliary hydraulic pressure chamber 54, equal to the hydraulic pressure accumulated in the accumulator 22, is received by the auxiliary piston 53 at its annular pressure-receiving stepping portion 53b. Further, hydraulic pressure in the hydraulic pressure chamber 5 is applied onto an area of the primary piston 3 substantially equal to the cross-sectional area of the hydraulic pressure chamber 5. Accordingly, the hydraulic pressure $P_M$ within the hydraulic pressure chamber when the intake valve 31 is closed is represented by the equation:

$$P_M = (A_B/A_M) \cdot P_A$$

where $A_M$ represents the pressure receiving area of the piston 3; $A_B$ is the pressure receiving area of the auxiliary piston; and $P_A$ is hydraulic pressure in the accumulator 22.

In short, the hydraulic pressure $P_M$ within the hydraulic pressure chamber 5 can be established by the ratio of the pressure-receiving areas $A_B/A_M$. If this ratio is set to be less than 1, the maximum hydraulic pressure applied to the wheel cylinders 8 and 13 is less than the hydraulic pressure $P_A$ of the accumulator 22, which can prevent vibration of the vehicles caused by the braking force traction control, thereby enabling smooth traction control preventing a large load from being applied on the driving system.

Figure 11:
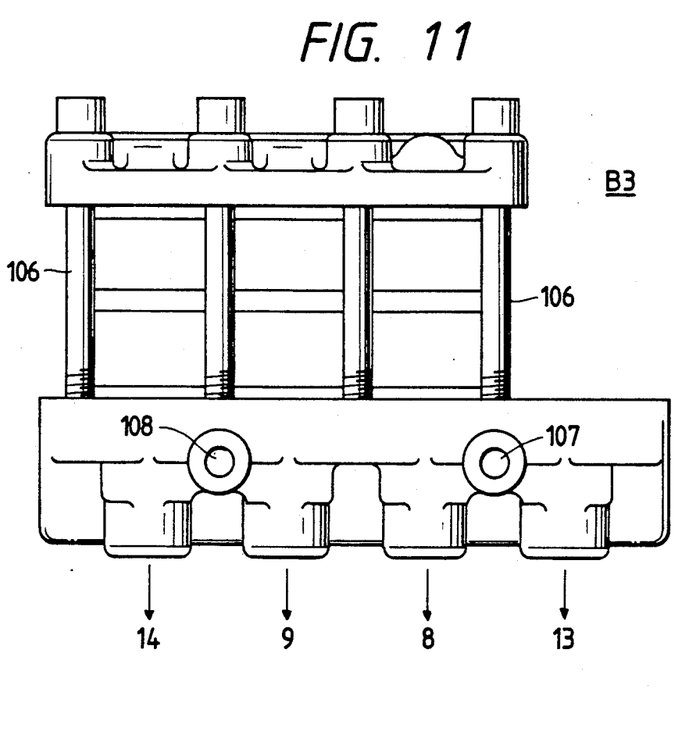
FIG. 11 is a front view of a three-channel control distributor assembly.

FIG. 11 is a front view of a three-channel control distributor assembly B3, where the brake hydraulic pressure control apparatus is formed as a three-channel type, and the distributor assembly B3 replacing the distributor assembly B4 is attached to the master cylinder assembly A.

Figure 12:
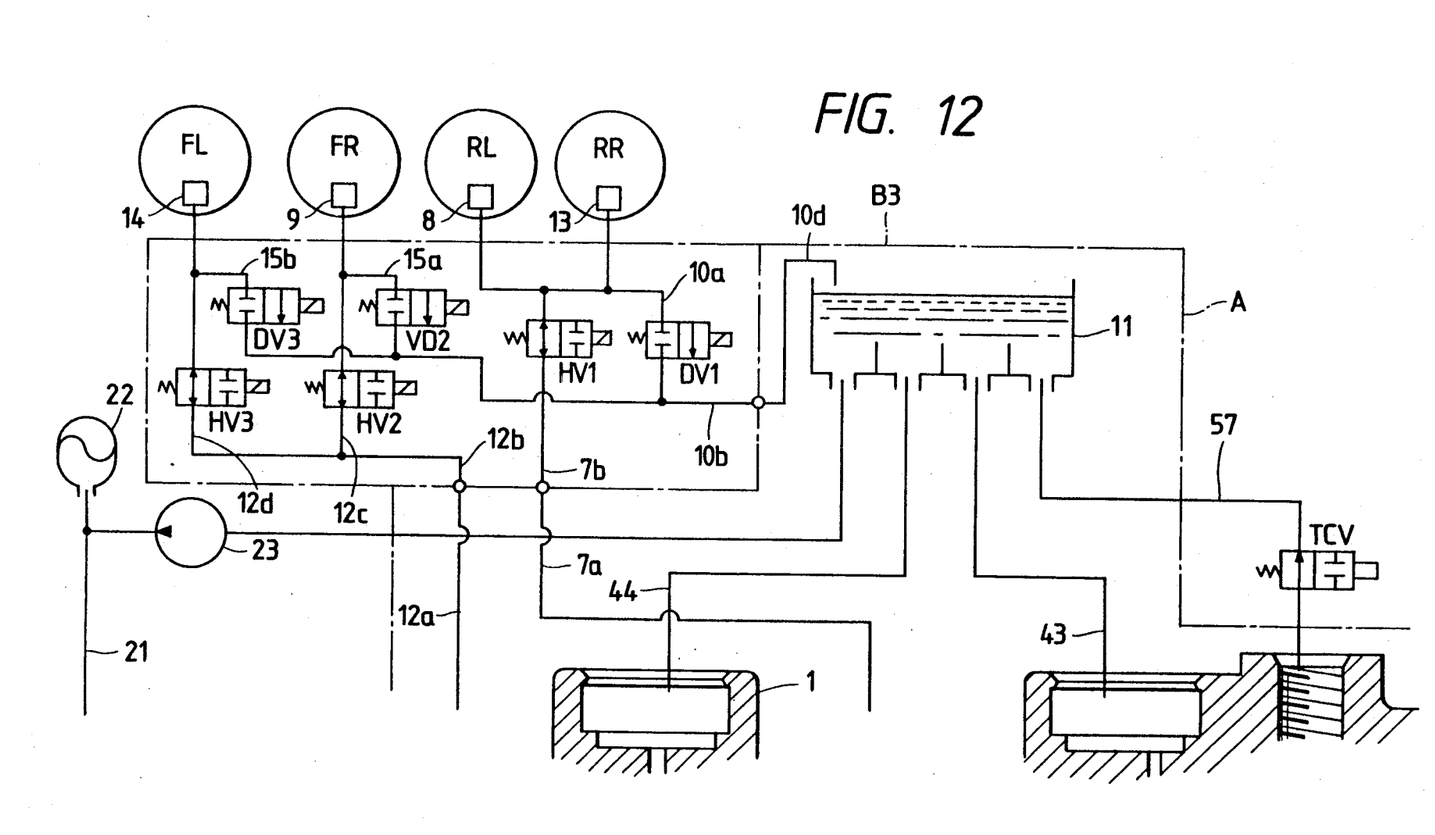
FIG. 12 is a cross-sectional view of the internal configuration of the assembly of FIG. 11.

FIG. 12 is a view of the internal configuration showing the condition in which the distributor assembly B3 is attached to the master cylinder assembly A. In the drawing, the distributor assembly contains three hold valves HV1 to HV3, and three decay valves DV1 to DV3.

The configuration of the master cylinder body 1 is shown in FIG. 5. The hydraulic passage 7a communicating with hydraulic pressure chamber 5 of the master cylinder body 1 is connected to the hydraulic passage 7b in the distributor assembly B3. The hydraulic passage 7b contains hold valve HV1 and is connected to the wheel cylinders 8 and 13 of the rear left and rear right wheels RL and RR. The wheel cylinders 8 and 13 are connected to the hydraulic passage 10b through the hydraulic passage 10a having the decay valve DV1 in the middle thereof. The hydraulic passage 10b is connected to the reservoir 11 through hydraulic passage 10d.

The hydraulic passage 12a leading out of the hydraulic pressure chamber 6 of the master cylinder body 1 is connected to the hydraulic passage 12b in the distributor assembly B3. The hydraulic passage 12b is connected both to the wheel cylinder 9 of the front right wheel FR and to the wheel cylinder 14 of the front left wheel FL through the hydraulic passages 12c and 12d containing hold valves HV2 and HV3, respectively. The wheel cylinders 9 and 14 are connected to the hydraulic passage 10c through the hydraulic passages 15a and 15b containing the decay valves DV3 and DV2. The hydraulic passage 10c is connected to the reservoir 11 through the hydraulic passage 10d.

Figure 13:
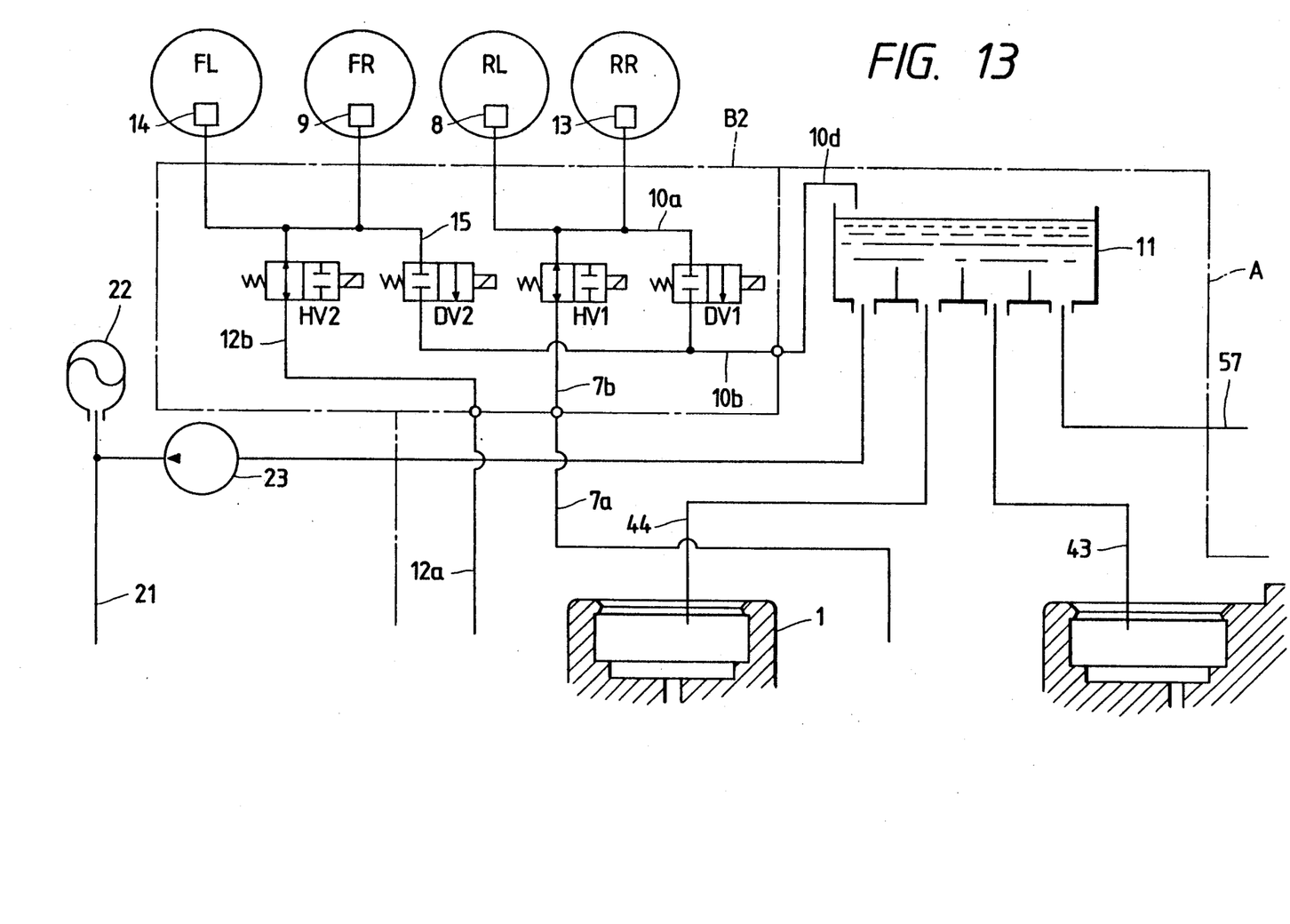
FIG. 13 is a cross-sectional view of the internal configuration of a two-channel control distributor assembly.

FIG. 13 is a cross-sectional view of the internal configuration of a two-channel control distributor assembly B2 attached to the master cylinder assembly A. The distributor assembly B2 contains two hold valves HV1 and HV2, and two decay valves DV1 and DV2. Also in this case, the hydraulic passage 7a communicating with hydraulic pressure chamber 5 of the master cylinder body 1 is connected to the hydraulic passage 7b in the distributor assembly B2. The hydraulic passage 7b contains hold valve HV1 and is connected to the wheel cylinders 8 and 13 of the rear left and rear right wheels RL and RR. The wheel cylinders 8 and 13 are connected to the hydraulic passage 10b through the hydraulic passage 10a containing decay valve DV1. The hydraulic passage 10b is connected to the reservoir 11 through the hydraulic passage 10d.

On the other hand, the hydraulic passage 12a communicating with the hydraulic pressure chamber 6 of the master cylinder body 1 is also connected to the hydraulic passage 12b in the distributor assembly B2. The hydraulic passage 12b is connected to the wheel cylinders 14 and 9 of the front left and front right wheels FL and FR through the hold valve HV2. The wheel cylinders 9 and 14 are connected to the hydraulic passage 10b through the hydraulic passage 15 having the decay valve DV2 in the middle thereof.

As is obvious from the above description, the brake hydraulic pressure control apparatus according to the present invention is designed so that a distributor assembly having electromagnetic valves corresponding in number to the controlled channels may be removably attached to a master cylinder assembly. Further, hydraulic passages within the two assemblies are connected to each other upon the attachment of the distributor assembly to the master cylinder assembly. Accordingly, the number of the controlled channels can be changed easily and inexpensively. In particular, in this embodiment, the distributor assembly can be attached to the master cylinder assembly only with the use of two attachment bolts 101 and 102. As a result, the distributor assembly can be interchanged easily.

Further, in this embodiment, the forward end portions 31a and 32a of the intake valves 31 and 32 of the master cylinder body 1 are designed so as not to project into the hydraulic pressure chambers 5 and 6 at the time of ordinary control but to project into the hydraulic pressure chambers 5 and 6 only during anti-lock and traction control. Accordingly, the durability of the intake valves 31 and 32 is improved. Further, the piston 63 is pressed by the hydraulic pressure of the hydraulic pressure chambers 5 and 6 at the time of ordinary control so that the hydraulic pressure acts as a pressing force between the valve seat surface 63a of the piston 63 and the valve portion 31b of the intake valve 31. With this construction, the sealing properties of the valve portion 31b during ordinary control are very good.

Furthermore, in this embodiment, both a sealing portion from the side of the hydraulic pressure chambers 5 and 6 and a sealing portion from the side of accumulator 22 are formed in the hydraulic passages 20 and 21 connected between the accumulator 22 and the hydraulic pressure chambers 5 and 6 by the valve portions of the intake valves 31 and 32 and the valve seat surfaces of the pistons. Thus, the sealing portions are very reliable.

What is claimed is:

1. A brake hydraulic pressure control apparatus providing anti-lock control for preventing the locking of vehicle wheels during braking and providing traction control to prevent slipping of the vehicle wheels during starting or accelerating of the vehicle, the apparatus comprising:

a master cylinder assembly comprising a master cylinder body, a primary piston disposed in a first hydraulic pressure chamber of said master cylinder body, a secondary piston disposed in a second hydraulic pressure chamber of said master cylinder body, first and second valve mechanisms communicating with said first and second hydraulic pressure chambers through opening portions in said master cylinder body, a hydraulic pressure pump for producing hydraulic pressure, said hydraulic pressure pump communicating with an accumulator and a reservoir fixed in an upper portion of said master cylinder body, and an auxiliary piston disposed in an annular chamber of said master cylinder body, said auxiliary piston being coaxial with said primary piston and slidable relative to said master cylinder body and said primary piston;

hydraulic passages within said master cylinder assembly;

a distributor assembly removably attached to said master cylinder assembly, said distributor assembly including a predetermined number of control channel means for controlling the vehicle wheels, a predetermined number of hydraulic passages, and a predetermined number of electromagnetic valves corresponding to the predetermined number of control channel means, said electromagnetic valves being disposed in said hydraulic passages for performing said anti-lock and traction control on said vehicle wheels; and connecting means for connecting the hydraulic passages of said master cylinder assembly with said hydraulic passages of said distributor assembly when said master cylinder assembly and said distributor assembly are assembled;

each of said valve mechanisms comprising an intake valve disposed in a valve chamber of said master cylinder body, said intake valve having an end portion which extends through one of said opening portions of said master cylinder body into one of said first or second hydraulic pressure chambers, a piston coaxial with and partly surrounding said intake valve, and a plurality of hydraulic passages.

2. The apparatus of claim 1 wherein one of said hydraulic passages of said valve mechanisms connects said accumulator with said valve chamber of said second valve mechanism, another of said hydraulic passages connects said valve chamber of said first valve mechanism with said reservoir via an auxiliary hydraulic pressure chamber formed by said auxiliary piston and said master cylinder body, and another of said hydraulic passages connects the valve chambers of said first and second valve mechanisms.

3. The apparatus of claim 2 wherein an anti-lock control valve is located in said hydraulic passage between said first valve mechanism and said reservoir.

4. The apparatus of claim 2 wherein a supply valve is located in said hydraulic passage between said accumulator and said second valve mechanism.

5. The apparatus of claim 2 wherein a hydraulic passage connects said auxiliary hydraulic chamber with said reservoir and a traction control valve is disposed in said hydraulic passage between said auxiliary hydraulic chamber and said reservoir.

* * * * *

UNITED STATES PATENT AND TRADEMARK OFFICE
CERTIFICATE OF CORRECTION

PATENT NO.  : 5,071,201

DATED       : December 10, 1991

INVENTOR(S) : TOSHIFUMI MAEHARA

It is certified that error appears in the above-identified patent and that said Letters Patent is hereby corrected as shown below:

On the Title page, item [73] Assignees:
   line 3, delete "Search".

Signed and Sealed this

Twenty-ninth Day of June, 1993

Attest:

MICHAEL K. KIRK

Attesting Officer

Acting Commissioner of Patents and Trademarks